(12) United States Patent
Silvestro et al.

(10) Patent No.: US 9,152,140 B2
(45) Date of Patent: *Oct. 6, 2015

(54) SEQUENTIAL FUNCTION CHART (SFC) ONLINE EDITING WITHOUT RESET

(71) Applicant: Rockwell Automation Technologies, Inc., Mayfield Heights, OH (US)

(72) Inventors: Michael Silvestro, Twinsburg, OH (US); Joshua Steven Dearth, Mayfield Heights, OH (US); Christopher E. Stanek, Willoughby, OH (US); John Ethan Belcher, Euclid, OH (US); Ronald E. Bliss, Twinsburg, OH (US); Jeffery William Brooks, Mentor, OH (US); Jack Michael Visoky, Cleveland Heights, OH (US)

(73) Assignee: Rockwell Automation Technologies Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/107,513

(22) Filed: Dec. 16, 2013

(65) Prior Publication Data

US 2014/0107814 A1 Apr. 17, 2014

Related U.S. Application Data

(63) Continuation of application No. 11/863,840, filed on Sep. 28, 2007, now Pat. No. 8,612,886.

(51) Int. Cl.
| | | |
|---|---|---|
| *G06F 3/0481* | (2013.01) | |
| *G05B 19/05* | (2006.01) | |
| *G05B 19/042* | (2006.01) | |

(52) U.S. Cl.
CPC ............ *G05B 19/05* (2013.01); *G05B 19/0426* (2013.01)

(58) Field of Classification Search
USPC ................ 715/809; 700/18, 83; 717/113, 168
See application file for complete search history.

(56) References Cited

U.S. PATENT DOCUMENTS

| | | | |
|---|---|---|---|
| 4,140,953 A | | 2/1979 | Dunne |
| 5,014,208 A | | 5/1991 | Wolfson |
| 5,276,901 A | * | 1/1994 | Howell et al. ................... 340/5.2 |
| 5,572,673 A | * | 11/1996 | Shurts .............................. 726/17 |
| 5,644,487 A | | 7/1997 | Duff et al. |
| 5,781,776 A | | 7/1998 | Johnston et al. |
| 5,808,278 A | | 9/1998 | Moon et al. |
| 5,812,394 A | * | 9/1998 | Lewis et al. ...................... 700/17 |

(Continued)

OTHER PUBLICATIONS

European Office Action dated Mar. 10, 2014 for European Application No. 08165349.5-1802 / 2045676, 2 pages.

(Continued)

*Primary Examiner* — Phenuel Salomon
(74) *Attorney, Agent, or Firm* — Amin, Turocy & Watson, LLP

(57) ABSTRACT

A change monitor as part of an online editor of a sequential function chart (SFC) programming environment monitors edits to a control routine. The change monitor provides warning to users before taking actions that would result in a reset of the control routine currently being executed by an industrial controller. The change manager reduces or eliminates many situations that would otherwise result in a reset as well by instructing online editor as to what language elements need to be assembled to implement the change. The change monitor also filters the manner in which reset warnings are given to reduce unnecessary distractions.

20 Claims, 11 Drawing Sheets

(56) References Cited

U.S. PATENT DOCUMENTS

| | | | |
|---|---|---|---|
| 5,970,243 | A | 10/1999 | Klein et al. |
| 6,169,934 | B1 | 1/2001 | Nakayama et al. |
| 6,268,789 | B1 * | 7/2001 | Diamant et al. ............ 340/5.74 |
| 6,272,388 | B1 * | 8/2001 | Buvel et al. .................... 700/86 |
| 6,289,252 | B1 | 9/2001 | Wilson et al. |
| 6,349,238 | B1 | 2/2002 | Gabbita et al. |
| 6,477,437 | B1 | 11/2002 | Hirota |
| 6,732,006 | B2 | 5/2004 | Haanstra et al. |
| 6,907,308 | B1 * | 6/2005 | Bartlett et al. ................ 700/121 |
| 7,020,876 | B1 | 3/2006 | Deitz et al. |
| 7,283,882 | B1 | 10/2007 | Bransky et al. |
| 7,369,913 | B2 | 5/2008 | Heminway et al. |
| 7,598,494 | B2 | 10/2009 | Shock et al. |
| 7,793,292 | B2 | 9/2010 | Worek et al. |
| 2005/0027377 | A1 * | 2/2005 | Lucas et al. .................... 700/28 |
| 2006/0041324 | A1 * | 2/2006 | Chang et al. .................... 700/18 |
| 2007/0212846 | A1 * | 9/2007 | Yokouchi et al. ............ 438/402 |
| 2009/0125126 | A1 | 5/2009 | Moore et al. |

OTHER PUBLICATIONS

Extended European Search Report mailed Jan. 30, 2014 for European Patent Application 08 16 5349, 8 pages.

Office Action dated Sep. 3, 2010 for U.S. Appl. No. 11/863,840, 29 pages.

Office Action dated Feb. 18, 2011 for U.S. Appl. No. 11/863,840, 26 pages.

Office Action dated Jun. 6, 2012 for U.S. Appl. No. 11/863,840, 21 pages.

Office Action dated Jan. 22, 2013 for U.S. Appl. No. 11/863,840, 21 pages.

Siemens, SFC for Simatic S7 Manual, Nov. 2006, whole document.

Notice of Allowance dated Aug. 7, 2013 for U.S. Appl. No. 11/863,840, 22 pages.

European Office Action dated Nov. 21, 2014 for European Application No. 08165349.5-1802 / 2045676, 4 pages.

* cited by examiner

SEQUENTIAL FUNCTION CHART (SFC) ONLINE EDITING WITHOUT RESET

CROSS-REFERENCE TO A RELATED APPLICATION

This application is a continuation of and claims priority to U.S. application Ser. No. 11/863,840, filed Sep. 28, 2007, and entitled "SEQUENTIAL FUNCTION CHART (SFC) ONLINE EDITING WITHOUT RESET," the entirety of which is incorporated herein by reference.

TECHNICAL FIELD

The subject invention relates to industrial control systems and, more particularly, to systems and methods that perform online editing of controller routines.

BACKGROUND OF THE INVENTION

Industrial controllers are special purpose processing devices used for controlling (e.g., automated and semi-automated) industrial processes, machines, manufacturing equipment, plants, and the like. A typical controller executes a control program or routine in order to measure one or more process variables or inputs representative of the status of a controlled process and/or effectuate outputs associated with control of the process. Such inputs and outputs can be binary, (e.g., "1" or "0," "on" or "off," ...), and/or analog, assuming a continuous range of values. A typical control routine can be created in a controller configuration environment that has various tools and interfaces whereby a developer can construct and implement a control strategy using industrial and conventional programming languages or graphical representations of control functionality. Such control routine can be downloaded from the configuration system into one or more controllers for implementation of the control strategy in controlling a process or machine.

Measured inputs received from a controlled process and outputs transmitted to the process can pass through one or more input/output (I/O) modules in a control system. Such modules can serve in the capacity of an electrical interface between the controller and the controlled process and can be located local or remote from the controller. Inputs and outputs can be recorded in an I/O memory. The input values can be asynchronously or synchronously read from the controlled process by one or more input modules and output values can be written directly to memory by a processor for subsequent communication to the process by specialized communications circuitry. An output module can interface directly with a controlled process by providing an output from memory to an actuator such as a motor, drive, valve, solenoid, and the like.

During execution of the control routine, values of the inputs and outputs exchanged with the controlled process can pass through memory. The values of inputs in memory can be asynchronously or synchronously updated from the controlled process by dedicated and/or common scanning circuitry. Such scanning circuitry can communicate with input and/or output modules over a bus on a backplane or network. The scanning circuitry can also asynchronously or synchronously write values of the outputs in memory to the controlled process. The output values from the memory can be communicated to one or more output modules for interfacing with the process. Thus, a controller processor can simply access the memory rather than needing to communicate directly with the controlled process.

Several types of programming languages are used to create a control routine. A third part of open international standard IEC 61131 relates to programming languages and defines two graphical and two textual PLC programming language standards: Ladder diagram (LD); Function block diagram (FBD); Structured text (ST); Instruction list (IL); and Sequential function chart (SFC). Offline and online editing of respective control routines in each of these languages except for instruction list are often facilitated by third party programming software.

The ability to make, test, and implement edits online provides advantages for expeditiously performing maintenance, responding to a particular situation of an on-going industrial process, or other problems. This is particularly true for function block diagram (FBD) and structured text (ST) programming languages since these types of control routines complete an execution cycle with each controller scan. Thus, an original routine may be readily replaced with an edited routine without disturbing an on-going industrial process.

By contrast, sequential function chart (SFC) programming language usually does not complete an execution cycle during one scan of an industrial controller. A SFC is similar to a flowchart in that it navigates through steps and transitions to perform specific operations defined by actions and typically is used for high-level management of multiple operations, repetitive sequences of operations, batch processes, motion control using structured text, and state machine operations. Online editing of an SFC control routine results in resetting to an initial step of the routine, which can result in serious interruptions to the process.

As an example, consider a beer brewing industrial process that employs an SFC control routine with the following steps in the brewing recipe: (1) Add the ingredients; (2) Mix and heat ingredients; (3) Pour into cooling container; (4) Cool batch; (5) Pour into a fermenting container; (6) Ferment batch; and (7) Bottle beer. Each one of these steps in the recipe can take anywhere from a few hours to days or weeks. In a situation where the brew master starts a batch of beer and proceeds through steps 1 and 2, but upon step 3 a valve malfunctions the beer could undesirably be left in a heated container too long. The brew master can attempt to save the batch by changing the manner in which it is cooled, but that might require modifying the Sequential Function Chart routine code. Unfortunately, altering the Sequential Function Chart routine code to make these changes can cause the process to restart at the initial step, which is to add the ingredients. This reset of the process is undesirable since it means that the chart and the machine would be out of synchronization. The only way to rectify this would be by dumping the current batch and starting the process over at step 1. Alternatively, a customer could write custom code to implement such change. However, such changes typically intuitiveness of the SFC and online editing tool, and thus are often prone to introducing errors. In addition, such changes may require a level of expertise that is unavailable or otherwise expensive to obtain.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Its sole purpose is to present some concepts of the invention in a simplified form as a prelude to the more detailed description that is presented later.

Change monitoring of online editing of a routine reduces the need for resetting the routine of a controller in order to implement the change. Thereby, a currently operating step of the routine may proceed without interruption. In particular, monitoring pending changes affords an opportunity for notifications to a user so that unnecessary resets may be avoided. Moreover, tracking of the specific changes affords opportunities for committing changes of only those language elements necessary to implement the change. Thereby, downloading an entire routine that would force a reset is avoided.

In one aspect, a user employs an online editor via a user interface to make pending edits of a language element of an online routine. The pending edits are held in a language container or copy. A change monitor responds to a pending edit by identifying whether any changes, including additions, modifications, and/or deletions, between an original language element and the pending edit are of a nature to necessitate a reset. The change monitor can then perform a measure to prevent a reset of the controller.

In another aspect, a method includes classifying attributes of language elements that when changed and committed to form a routine would require resetting of a routine of a controller. Then pending edits to an online routine are monitored so that a measure can be performed to prevent reset when those classified attributes are detected.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
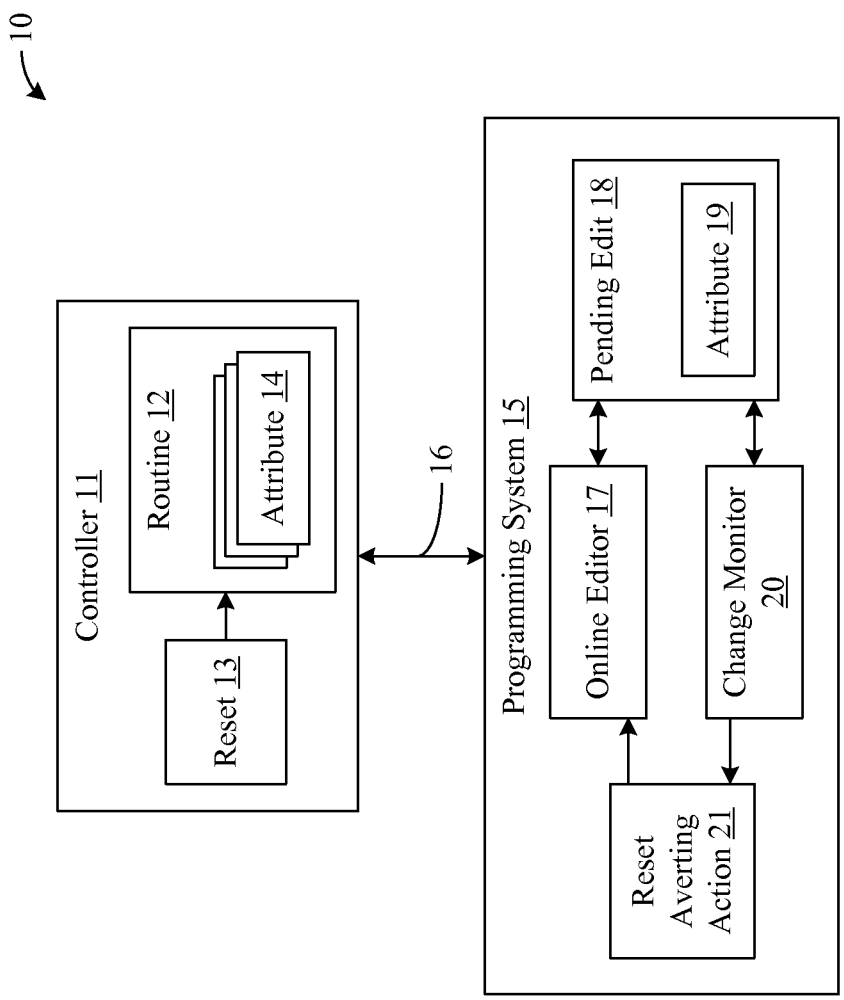
FIG. 1 is a high-level diagram of an online programming system.

A change monitor as part of an online editor of a sequential function chart (SFC) programming environment that monitors edits to a control routine. The change monitor provides a warning to users before taking actions that would result in a reset of an industrial controller currently executing an original routine. The change monitor reduces or eliminates many situations that would otherwise result in a reset as well by instructing an execution module as to what language elements need to be assembled to implement the change. The change monitor also filters the manner in which reset warnings are given to reduce unnecessary distractions.

The present invention is described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As utilized in this application, terms "component," "system," "controller," "device," "manager," and variants thereof are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers.

With reference to FIG. 1, a programmable industrial process 10 is operated by a controller 11 that performs a routine 12 composed of language elements that is subject to a reset component 13. Changes to a certain attribute 14 of the routine 12 necessitate a reset of the routine 12, which can be disruptive to the programmable industrial process 10 for routines 12 intended to execute over an extended period of time before returning to an initial state. Changes to another attribute 14 of the routine 12 may not require a reset, however. A programming system 15 can communicate via a data link 16 to the controller 11 so that an online editor 17 can makes changes to the language elements that would affect attributes 14 of the routine 12. In particular, the online editor 17 creates pending edits 18 that include a changed attribute 19 as compared to the attributes 14 of the routine 12. Substituting the pending edits 18 for the routine 12 as is generally understood would cause the reset component 13 to reset the changed version of routine 12. In order to avoid or minimize resets during online editing, a change monitor 20 of the programming system 15 assesses the changed attributes 19 of the pending edits 18 and performs a reset averting action 21 in response.

It should be appreciated with the benefit of the present disclosure that an attribute of the routine can comprise a quality, a characteristic, a step, a value, a structural sequence, etc. A change can include an added attribute, a modified attribute and/or a deleted attribute. For clarity, the controller 11 operating one routine 12 can be reset to commit changed attributes to begin executing. In an illustrative aspect, however, the controller 11 can perform a plurality of routines, functions, processes, operations, etc., (not shown) such that the routine 12 alone is reset without interrupting other routines.

Figure 2:
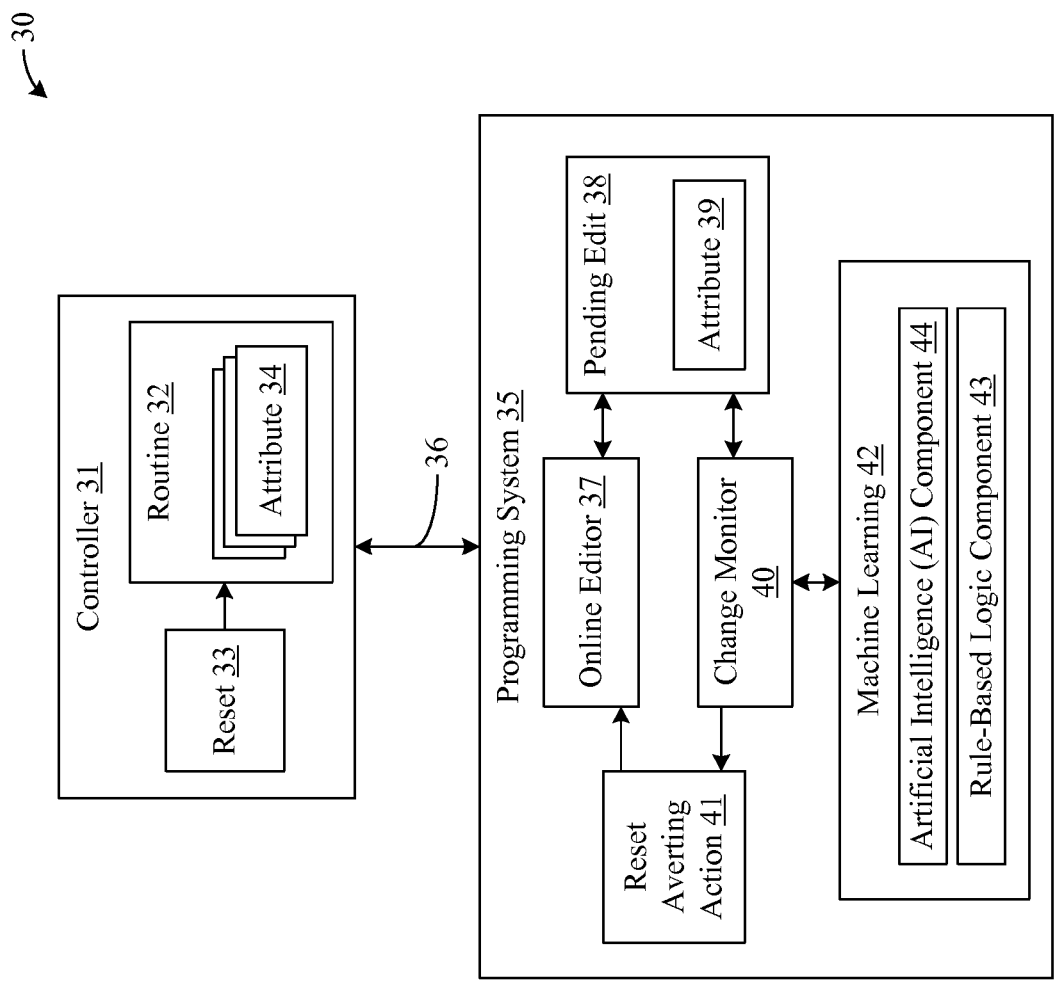
FIG. 2 is a high-level diagram of an online programming system incorporating a machine learning component.

In FIG. 2, an alternative a programmable industrial process 30 is operated by a controller 31 that performs a routine 32 composed of language elements that is subject to a reset component 33. Changes to a certain attribute 34 of the routine 32 necessitate a reset of the routine 32, which can be disruptive to the programmable industrial process 30 for a routines 32 intended to execute over an extended period of time before returning to an initial state. Changes to another attribute 34 of the routine 32 may not require a reset, however. A programming system 35 can communicate via a data link 36 to the controller 31 so that an online editor 37 can makes changes to the language elements that would affect attributes 34 of the routine 32. In particular, the online editor 37 creates pending edits 38 that include a changed attribute 39 as compared to the attributes 34 of the routine 32. Substituting the pending edits 38 for the routine 32 as is generally understood would cause the reset component 33 to reset the changed version of routine 32. In order to avoid or minimize resets during online editing, a change monitor 40 of the programming system 35 assesses the changed attributes 39 of the pending edits 38 and performs a reset averting action 41 in response. In some instances, the reset averting action 41 is a warning that allows a user to make changes in a way that avoids a reset or allows the user to knowingly commit the changes that will cause a reset, especially in situations where resetting is not detrimental. In other instances, the reset averting action 41 is the change tracking capability that allows for committing the changes in a way that a reset is not necessary.

The change monitor 40 includes a machine learning component 42, comprised of a rule-based logic component 43 and an artificial intelligence (AI) component 44, that is more adept at recognizing changed attributes 39 that require or do not require a reset and/or selects a more appropriate reset averting action 41 among several options.

The rules-based logic component 43 can be employed to automate certain functions described or suggested herein. In accordance with this alternate aspect, an implementation scheme (e.g., rule) can be applied to define types of attributes that should be acted upon or ignored, correlate language elements to attributes, create rules that are aware of a certain state of the routine 32 and whether or not the pending edit 38 pertains to the current state, preferences of a user interacting with the online editor 37 for types of reset averting actions, etc. By way of example, it will be appreciated that the rule-based implementation can automatically define criteria for a user level of expertise or authorization level to affect the industrial process 30. In response thereto, the rule-based implementation can change the amount of notifications given, the level of detail provided, and/or prevent edits altogether that would result in a reset.

The AI component 44 can facilitate automating performance of one or more features described herein such as predicting user inclinations. Thus, employing various AI-based schemes can assist in carrying out various aspects thereof. For example, a process for determining whether or not a particular online edit detrimentally affects an ongoing industrial process 30 to be facilitated via an automatic classifier system and process. For instance, the AI component 44 could be trained in a learning mode wherein the process 30 has actuated components deactivated or simulated. A user could indicate what changes in operation should not occur without warning a user. Then the AI could detect what classes of changes result in changes to these operations or not, learning what online edits are of concern and what online edits can be ignored.

A classifier is a function that maps an input attribute vector, $x=(x1, x2, x3, x4, xn)$, to a class label class(x). A classifier can also output a confidence that the input belongs to a class, that is, $f(x)=confidence(class(x))$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs that splits in an optimal way the triggering input events from the non-triggering events. Other classification approaches, including Naïve Bayes, Bayesian networks, decision trees, neural networks, fuzzy logic models, maximum entropy models, etc., can be employed. Classification as used herein also is inclusive of statistical regression that is utilized to develop models of priority.

As will be readily appreciated from the subject specification, the subject invention can employ classifiers that are pre-trained (e.g., via a generic training data from multiple users) as well as methods of reinforcement learning (e.g., via observing user behavior, observing trends, receiving extrinsic information). Thus, the subject invention can be used to automatically learn and perform a number of functions, including but not limited to determining, according to a predetermined criteria, what constitutes a reset condition of concern, when/if to communicate impending controller reset, when/if to prevent a controller reset, preferences for types of data to exchange, etc.

Figure 3:
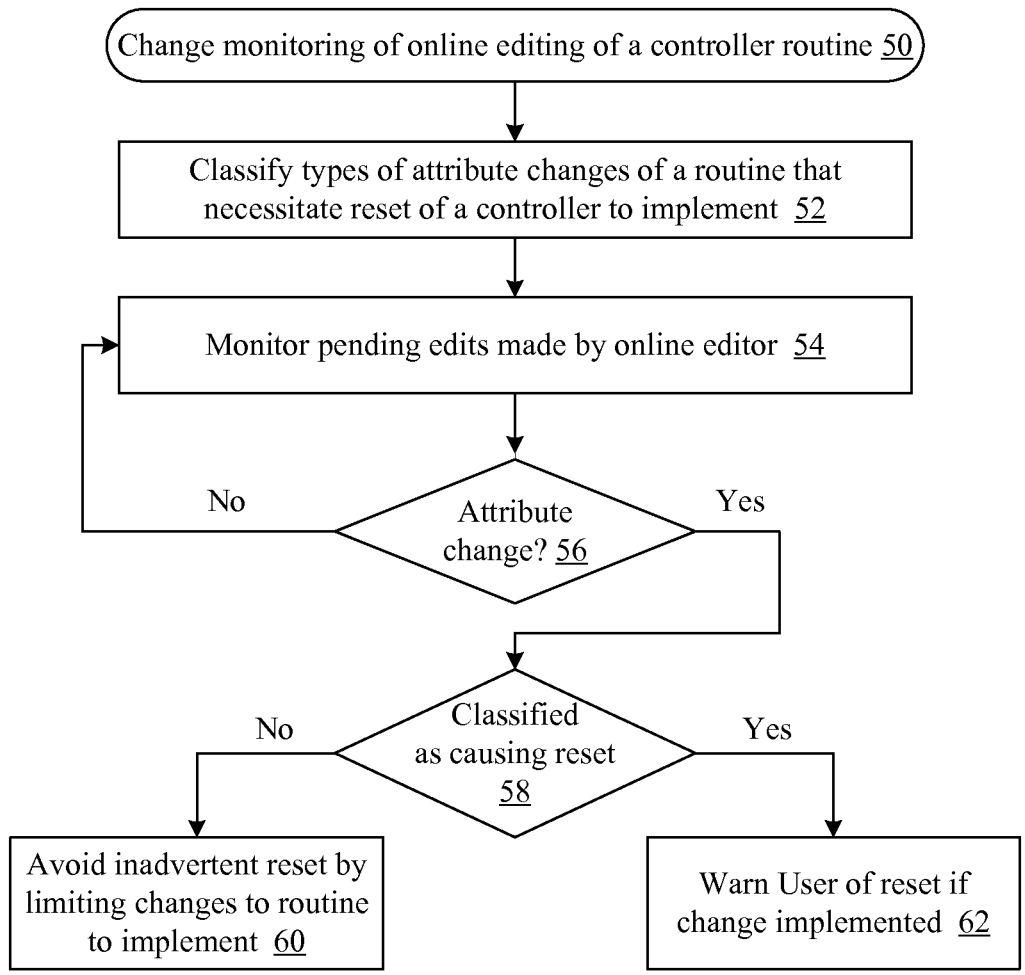
FIG. 3 is high-level flow diagram of a methodology performed by the online programming system of FIG. 1.

In FIG. 3, a methodology 50 for change monitoring of online editing of a controller routine begins in block 52 by classifying types of attribute changes of a routine that necessitate reset of a controller to implement. When an online editing session commences, pending edits are monitored in order to reduce the likelihood of an unnecessary or inadvertent reset that would detrimentally affect an ongoing controlled process. In particular, in block 56 when an attribute change is detected, a determination is made in block 58 as to whether this detected change is classified as causing a reset. If not, in block 60 implementation is limited to making changes necessary to the routine and avoiding unnecessary changes that would cause a reset. By managing the extent of the changes, it becomes unnecessary to reset the routine in all or most instances of changes when unable to determine whether or not the reset is required. If in block 60 the change is classified as warranting a reset, then a warning is given to the user in block 62 that a reset will occur if the change is implemented. Then the user can choose to knowingly proceed or to create an alternate change that could avoid a reset. Thus, the methodology 50 performs a reset averting action for both an instance where a change requires a reset and an instance where a change does not.

Figure 4:
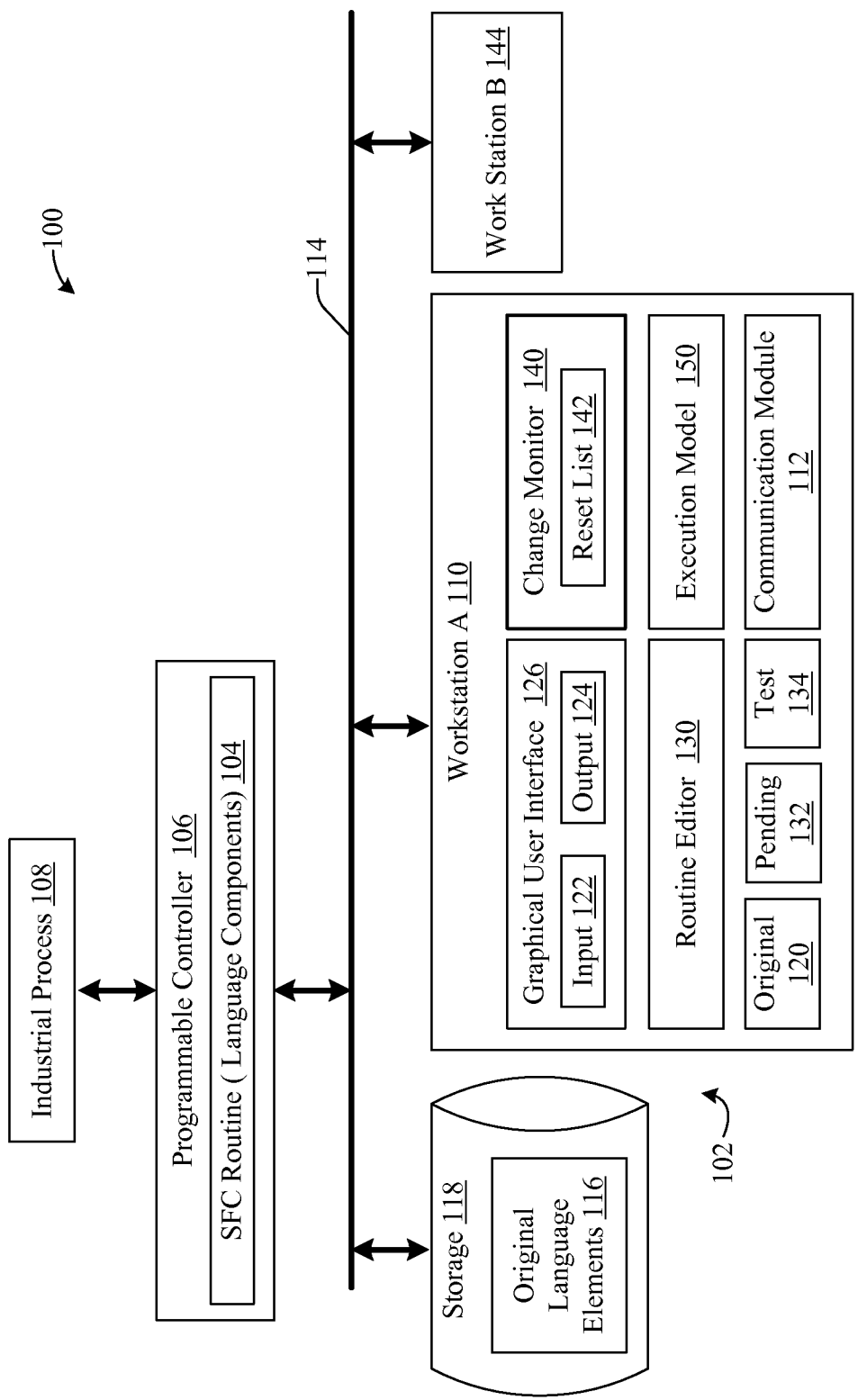
FIG. 4 illustrates a block diagram of an online programming environment of a sequential function chart (SFC) routine executed by a controller to operate an on-going industrial control process.

FIG. 4 illustrates an industrial control system 100 having a controller programming environment 102 that performs online edits of an SFC routine 104 composed of programming language components that is executed by an industrial controller 106 to control an industrial process 108. A workstation A 110 performs the online edit by forming a network connection via a communication module 112 to the controller 106 over a data bus 114. Original language elements 116 contained within a code repository or library 118 are accessed so that a copy in an original container 120 may be readily accessed by the workstation A 110. A user interacts via an input 122 and output 124 of a graphical user interface (GUI)

126 with a routine editor 130 that creates pending edits based on the original routine 120 in a pending container 132. The user can accept the pending edits that are then stored in a test container 134.

A change monitor 140 responds to the changes as they occur in the pending edits 132, comparing them against a reset list 142, which only the change monitor 140 has access to, to determine which changes would result in a reset, warning the user via the GUI 126, and perhaps one or more workstations B 144 also on the data bus 114. Given that the change monitor 140 tracks the extent of the changes as well as whether a reset is necessary, the change monitor further instructs an execution model 150 as to what language components 104 should be changed in the controller 106. The change model 150 is an aspect of the routine editor 130 that handles the transfer of software components (e.g., language elements) to commit a pending change for execution. The change tracking and reset implication tracking made by the change monitor 140 enables these transfers to be done in a way that avoids reset of the routine 104 in many instances.

If the change monitor 140 determines that the SFC does not need to be reset, based on the changes the user made, just the test edit attributes of elements that did change are downloaded to the controller 106 and the currently executing Step will continue to execute. Firmware supports wrapping changed pieces of the SFC in a transaction. If any part of the download fails, the entire process will fail and not be allowed. This will prevent incomplete data from being executed in the controller 106 in case of communication loss, etc. The execution model 150 need only download attributes of an element which has changed in the pending edits container 132. To accomplish this, the execution model 150 queries the change monitor 140, which in turn responds with what the execution model 150 is to download.

The change monitor 140 also filters reset warnings received from the one or more other workstations 144 so that unnecessary distractions are reduced on the GUI 126.

Table 1A is an illustrative list of the types of online edits that would cause a reset but for the intervention of the change monitor 140. Note that currently only two changes would not cause a reset with the benefit of the change monitor, specifically change language element description and change text box contents.

TABLE 1A

| Online Action |
|---|
| Move Language Elements (no wiring changes) |
| Create Text Box |
| Delete Text Box |
| Step Preset Use Expression On/Off |
| Step Preset Expression Change |
| Step Limit High Use Expression On/Off |
| Step Limit High Use Expression |
| Step Limit Low Use Expression On/Off |
| Step Limit Low Use Expression |
| Step Show Action in Routine |
| Step Never Display Description in Routine |
| Step Save Element Defaults |
| Step Property Page value changes |
| Action Body |
| Action Preset Use Expression On/Off |
| Action Preset Use Expression |
| Action Property Page value changes |
| Transition Condition |
| Transition Never Display Description in Routine |

In other instances, while the change monitor 140 may not be in a position to avoid a reset due to a change, the change monitor 140 does provide alerts to the user so that such resets are done knowingly and thus hopefully without detrimental effects to an on-going industrial process. An illustrative example of the types of changes that result in such notifications are given in Table 1B:

TABLE 1B

| Online Action |
|---|
| Create Step |
| Create Action |
| Create Transition |
| Create Stop |
| Create Branch |
| Create Branch Leg |
| Create SBR/RET |
| Create Wire |
| Delete Step |
| Delete Action |
| Delete Transition |
| Delete Stop |
| Delete Branch |
| Delete Branch Leg |
| Delete SBR/RET |
| Delete Wire |
| Change Step Specifier |
| Initial Step |
| Step Enable Alarm |
| Step Change Action Order |
| Step Insert Element Defaults |
| Step Insert Factory Defaults |
| Change Action Specifier |
| Change Action Order |
| Action Qualifier |
| Action Boolean |
| Action Indicator Tag |
| Change Transition Specifier |
| Diverge Branch Change Sequence Order |
| SBR/RET Add parameter |
| SBR/RET Delete parameter |
| SBR/RET Move parameters |

It should be appreciated with the benefit of the present disclosure that this listing is illustrative. In some applications, particular attribute changes listed in Table 1B need not force a reset. For clarity, these classifying decisions are depicted as sorting such types of attribute changes. However, the change monitor 140 can further evaluate each attribute change on a case by case basis to evaluate the effect on a particular portion of the routine 104, finding that such a change (e.g., addition, modification or deletion) actually need not force a reset when committed.

Elements in routine 104 are inserted and maintained in the reset list 142 as a speed optimization. Having an easy way to lookup and retrieve an element prevents the change monitor 140 from having to search through the elements in each container 120, 132, 134 every time one is needed for comparison. For example, the reset list 142 can track an element ID with full specifier with a corresponding original element ID, pending element ID, test element ID, and whether a reset is required for this record.

The reset list 142 is a list of all language elements in the SFC routine 104. Conceptually, the reset list 142 can be thought of as a table like Table 2 (see above), but can be stored in the Hash Table of the change monitor 140. Each row corresponds to a language element in its respective language container. Each column represents a piece of data, such as depicted in Table 2, about the element, which is contained within a newly created structure and includes the element name string; original, pending, and test edit unit identifier (UID) for the element in each container; and a Boolean that indicates whether or not the changes to the element between containers will necessitate a reset.

TABLE 2

| Data | Type | Description |
| --- | --- | --- |
| Element Name | String | Contains the Element's name. |
| Original UID | DWORD | Contains the UID of the Element with the given elementName in the Original Container. |
| Pending UID | DWORD[ ] | Contains the UID(s) of the Element(s) with the given elementName (multiple Elements may have this elementName) in the Pending Edits Container. |
| Test UID | DWORD | The UID of the Element in the Test Container with the given elementName. |
| Reset Required | bool | Indicates if the change to the Element requires a reset to occur or not. |

The language elements of a SFC include steps, stops, branches, transitions, and actions. A step represents a major function of the process and contains the actions that occur at a particular time, phase or station. A transition is a true or false condition that tells the SFC when to go to the next step. A simultaneous branch executes more than one step at a time, thus SFC programming language supports simultaneous operations. A selection branch chooses between different execution paths. Text boxes may be added to assist in support and maintenance of the routine. It is also possible to insert structured text actions inside an SFC program (e.g., this is the standard way to work on integer variables).

While the illustrative programming language described here is a sequential function chart (SFC), it is to be appreciated with the benefit of the present disclosure that such routines can be generated in essentially any programming language. Examples of suitable languages include industrial control languages (e.g., structured text (ST), sequential function chart (SFC), functional block diagram (FBD), instruction list (IL), and ladder diagram (LD)), C, C++, C#, Graphical Motion Language (GML), Java, Flow-Charts, etc., and/or any combination thereof. Such flexibility allows a developer to select a language(s) suited to a particular task(s) and provides for decomposition into logical elements and modularization to construct instruction sets that can be re-used, mitigate errors, and increase programming and user efficiency. Aspects described herein can be applied to these various programming languages.

Figure 5:
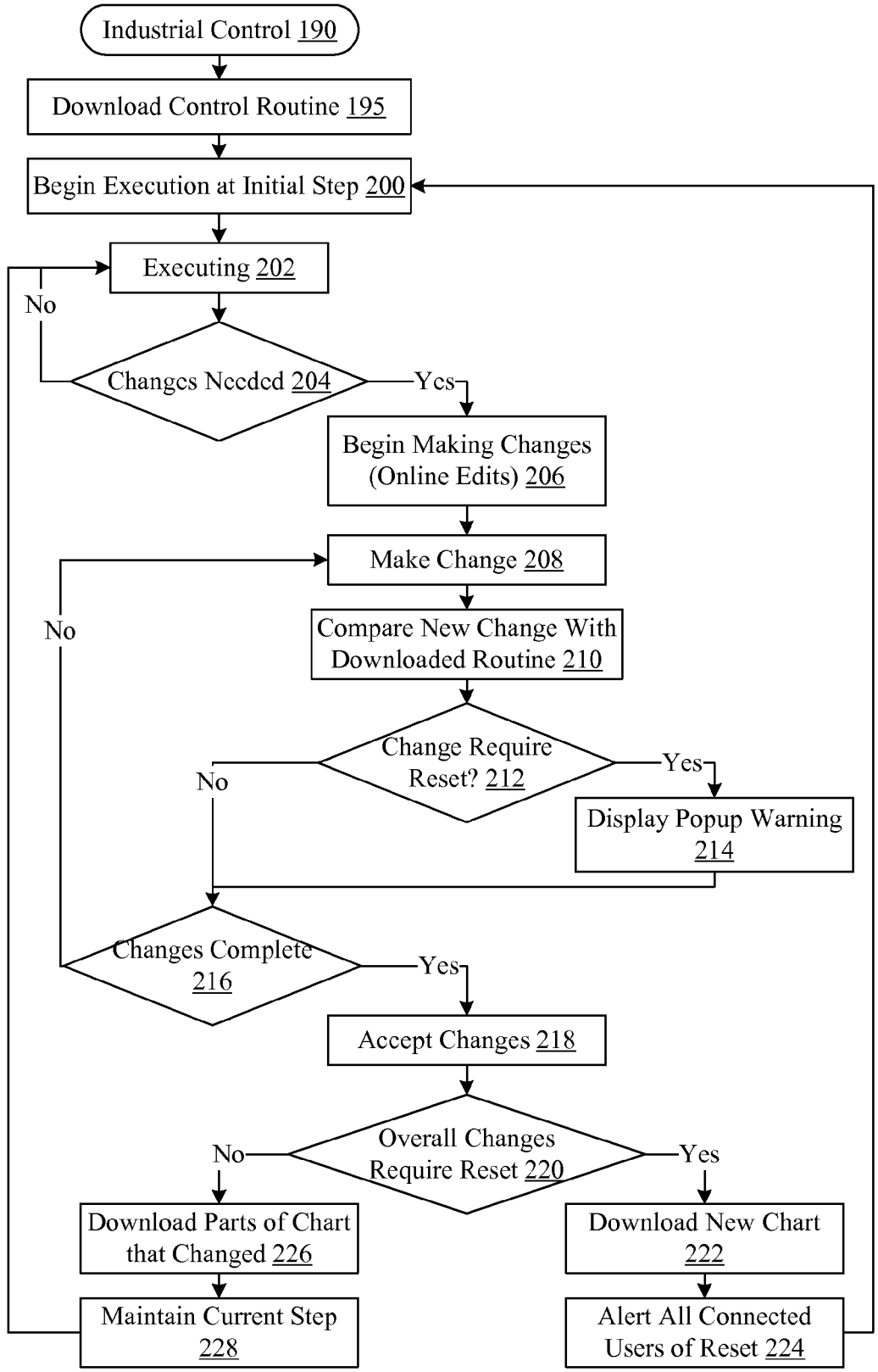
FIG. 5 illustrates a flow diagram of a main methodology performed by the industrial control process of FIG. 3.

In FIG. 5, a methodology 190 for operating an industrial process with an SFC control routine begins after the routine has been downloaded to the controller in block 195 and execution has commenced from the initial step in block 200. In block 202, execution has proceeded beyond the initial step. When a determination is made in block 204 that a change is needed to the routine, an online editor is invoked in block 206 in order to start a pending edit from with the routine. Then a change is made in block 208.

Online edits in sequential function chart programming are defined as any change made while online with the controller, such as changing adding and deleting language elements, editing transitions between language elements, changing the size and shape of a text box, etc. All of this information is stored in the controller to allow the sequential function chart program to be reconstructed upon upload.

Each sequential function chart routine in the online edit state can have three views in the illustrative version. The Original View is an option that is available when there are pending edits and/or test edits for a routine, and the user elects to view the original version of the routine. Clicking on this view displays the original (i.e., no edits) routine image from the controller (i.e., before you made any edits) in a read-only mode. It should be appreciated that the term "view" refers to a copy that is displayed to a user via a graphical user interface and that a "library container" or "copy" refers to a data structure containing SFC and any edits from which the view is generated.

The Original View is on the controller when online. The Pending Edits View is created when edits are made to a copy of the original routine stored in the workstation database. These edits are not committed until accepted by the user. The pending edits view represents the workstation's local image of the routine edits, and is visible only to the person performing those edits.

The Test Edits View is created after accepting a pending edit when the controller is in Run mode. This view is stored in the controller as well as in the offline workstation, and can therefore be viewed by all workstations. The test edits view always represents the test routine image in the controller. The Test Edits view is read-only.

Without the benefit of the change monitor 140, note that due to its state-based execution architecture, when switching from executing the Original SFC to the Test Edits version, and vice versa, the SFC is automatically reset to the initial step and all stored actions are reset (i.e., no longer running). When switching between the Test and Untest online edit state, control is being switched between the Test Edits version and the Original version. Note that when switching control from the Original version to the Test Edits version, the values of any SFC elements in the Test Edits version will initially be in the same state they were left in by the logic in the Original version. Adding initialization logic where appropriate can allow elements to start controlling the industrial process correctly when activated by testing and untesting edits. When parameter values are changed in an SFC element, the values are being changed in all versions of the routine. For example, changing a parameter value in the Test Edits version also changes the value of that parameter in the Original version, even if the Original View is the version of the routine actually running in the controller.

However, with the benefit of the change monitor, after a change is made in block 208, the new change is compared with the downloaded routine in block 210. If the change requires a reset in block 212, then a warning is presented to the user, depicted as a displaying a popup warning in block 214. If not requiring a reset in block 212 or after displaying the warning in block 214, then a determination is made in block 216 as to whether changes are complete. If not, processing returns to block 208 for more edits. If complete, then the user initiates acceptance of the changes in block 218. A further determination is then made as to whether the overall changes are of a nature requiring a reset in block 220. If so, a new chart is downloaded to the controller in block 222 and an alert of the reset is sent to all connected users in block 224. Returning to execution in block 202 thus causes the reset. If the overall changes do not require a reset in block 220, however, then just parts of the chart that have changed are downloaded to the controller in block 226 and the industrial process is maintained at the current step in block 228, followed continued execution at block 202. The change monitor thus detects changes between an Original Language Container and any Pending or Test Containers spawned from it. For any change that is made, the change monitor is notified, which in response detects if the change will cause a reset to occur and increments a "reset counter" if it does. The SFC change monitor allows the user to undo the change action and decrements the reset counter accordingly. If the reset count is non-zero, a reset will occur. If the reset count is zero, the SFC change monitor organizes and sends the pieces of the chart that did change as a full reset is not required.

In addition, the change monitor 140 performs internal cleanup after a "Cancel Pending Edits" occurs to maintain state and direct other subsystems how to do their cleanup of the cancelled edits. The change monitor 140 directs subsystems how to assemble the newly made edits in the controller when the user elects to "Accept Pending Edits" since the change monitor 140 track the information necessary to make that decision. "Assembling" within the present context specifically means that the test edits in the controller replace the original edits in the controller, ending the online edits process. The change monitor 140 performs internal state-management after the user accepts test edits since to track changes made to a routine.

Figure 6:
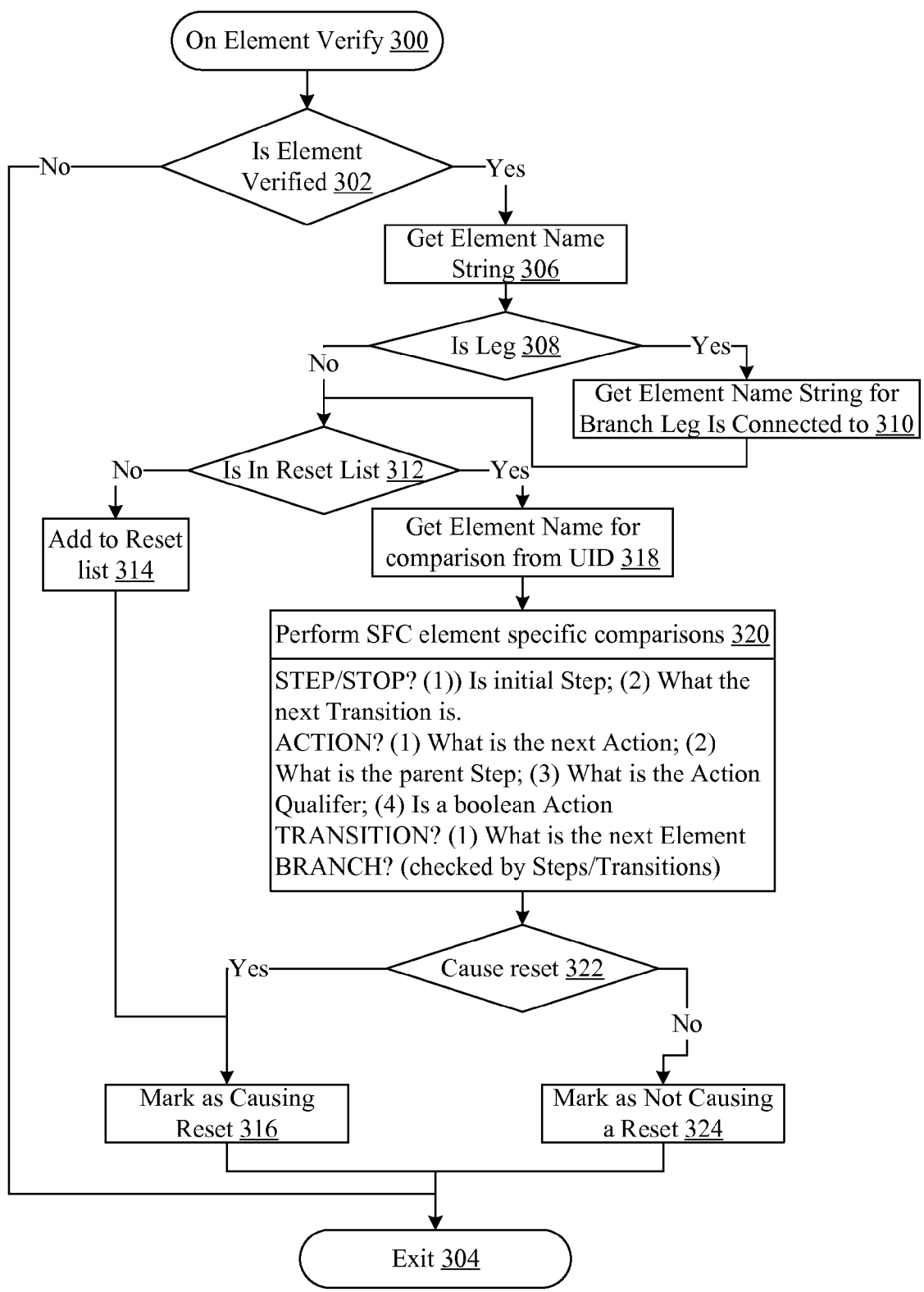
FIG. 6 illustrates a flow diagram of an On Element Verify methodology performed by a change monitor of the online programming environment of FIG. 3.

In the exemplary version of the change monitor 140, the determination of whether a change warrants a reset is determined by one of two verification methods that process the change along with the language element that was modified, which is then passed from the change monitor 140 to the execution model 150. In FIG. 6, the first method, an On Element Verify methodology 300, deals with creating, modifying and undeleting elements and connections. The On element Verify methodology 300 is called anytime that a verification takes place, handling situations such as when a user undoes a delete, changes a specifier, or changes the scope of a tag. In block 302, a determination is made as to whether the element in question is verified, and exits in block 304 if not. If verified, then the element name string is obtained in block 306 for correlating with the reset list.

Then a determination is made in block 308 as to whether the element is a Leg, which is indicated by the element name string being empty. If so, in block 310, the branch to which the leg is connected is obtained and acted upon as if the branch had been passed to the method since the change monitor is not concerned with legs. After blocks 308 and 310, then a further determination is made as to whether the element name string can be located in the reset list in block 312. If the element name string cannot be found, then the element is newly created in the pending container and is added to the reset list in block 314, marked as causing a reset in block 316, and exits in block 304.

If in the reset list in block 312, then the element from the pending edit source container is obtained via its UID in the reset list in block 318. Then, the attributes for the stored (base) element is compared by the change monitor with the (current) element for testing for reset. The attributes compared are focused on the subset that would determine whether or not a reset is required if changed. In the illustrative version, the attributes compared depend upon what type of element is being compared. If the element is a step or a stop, the latter being a special step, then an attribute comparison is made as to whether this (1) is initial step, and (2) what the next transition is. If the element is an Action, then the comparison of attributes is made regarding (1) what is the next action, (2) what is the parent step, (3) what is the action qualifier, and (4) is the action Boolean. If the element is a transition, the comparison is made as to what is the next element. With regard to elements that are a branch, all branch types are evaluated by comparing element name strings between the passed in branch and the base branch. The branches do not need to be concerned with the number of legs connected to them as steps and transitions always check to see what they are connected to, and will therefore automatically check the number of legs on a branch for the branch. If the branch is a diverge-select branch, the change monitor compares the leg sequence priority of the branch and the base branch. If they are different, a reset is required, otherwise no reset is required.

After the specific comparison in block 320, a determination is made in block 322 as to whether any differences were detected that warrant a reset. If so, the element is marked as causing a reset in block 316 and the method exits in block 304. If not, then the element is marked as not causing a reset in block 324 and the method exits in block 304.

Figure 7:
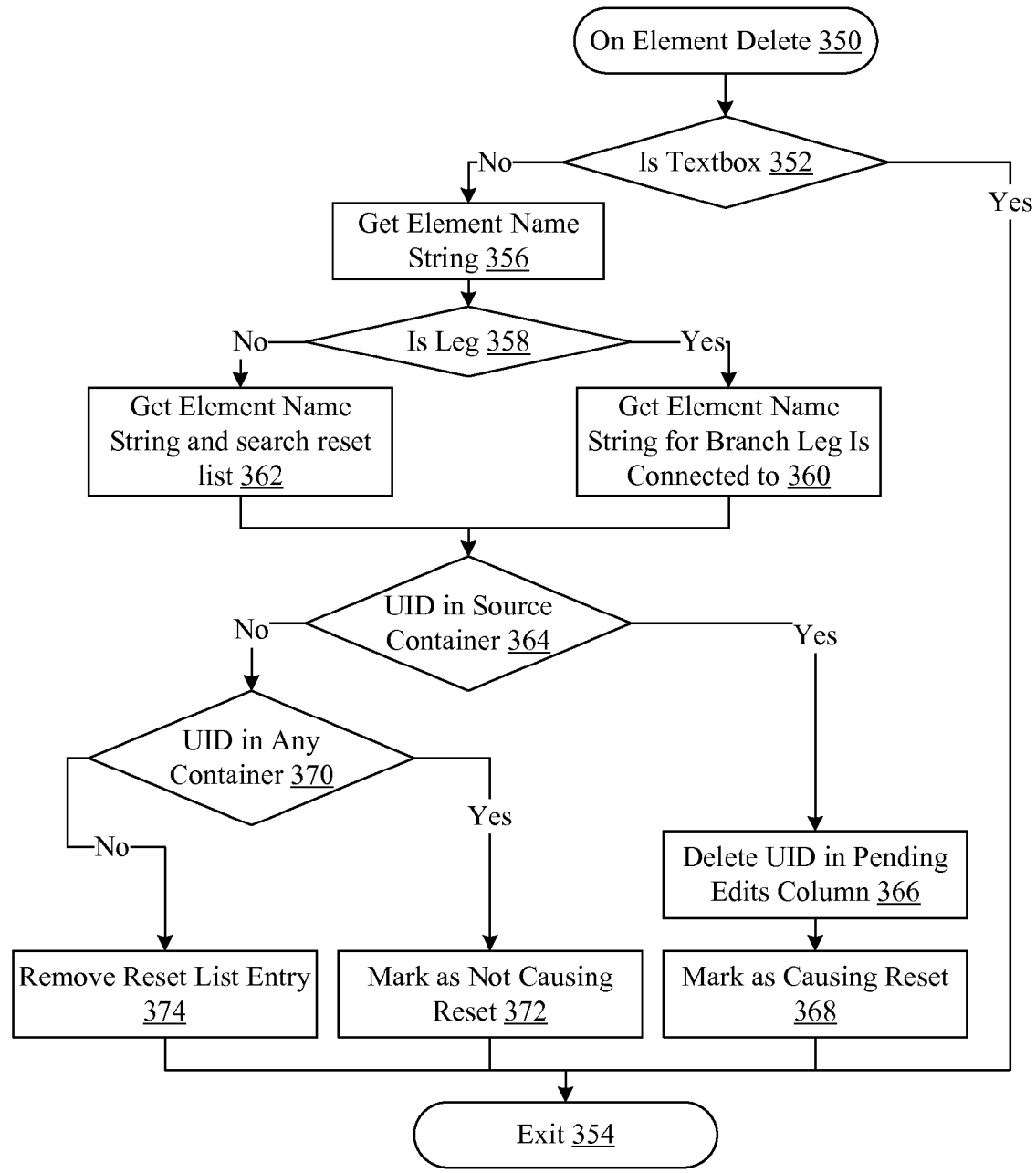
FIG. 7 illustrates a flow diagram of an On Element Delete methodology performed by the change monitor of the online programming environment of FIG. 3.

In FIG. 7, the second method, an On Element Delete method 350 deals with the deletion of an element or when a user undoes a create. No verification is done on that element since it no longer exists and a delete has the potential to cause a reset to occur. In bock 352, a determination is made as to whether the element is a textbox, since changes to a textbox should not cause a reset. Thus, if a textbox, the method 350 exits in block 354. If not a textbox in block 352, then the element name string is obtained in block 356. If the element is then determined to be a leg in block 358, then the element name string is obtained in block 360 for the branch that the leg is connected to since the change monitor is not concerned with the legs specifically. If not a leg in block 358, then in block 362 the element name string is obtained and searched for in the reset list. If not in the reset list, then the element never was in the list and the method fails.

After block 360 or 362, then a determination is made as to whether there is a UID for the element in its source container in block 364. If so, then in block 366 the UID for the element is deleted from the pending edits container. In block 368, the Boolean flag indicating that a reset is required is set to "false" as this element was added during pending edits and is now removed. If not in the source container in block 364, then a determination is made in block 370 as to whether a UID for the element is in the test or original views. If so, those entries will marked as not causing a reset in block 372, else the entire entry is removed from the reset list in block 374, and the method exits in block 354.

If the reset list contains one or more elements that require a reset, a new chart will be downloaded and a reset will occur. If the reset list has zero elements requiring a reset, a comparison of all elements in a language container will be done and only the elements that changed will need to be downloaded and a reset will not occur when the pending edits are accepted. Since the user is warned of any required reset prior to accepting pending edits, the user has an opportunity to manually change the state to one that will not cause a reset. Note that physically moving elements, adding/deleting/modifying text boxes, adding/deleting/modifying descriptions, or any other change that will only affect the depiction reconstruction data does not cause a reset to occur. After the pending edits are accepted, the change monitor moves pending edits UID holders to the UID holder in the target container. The pending edit UID list is emptied.

Figure 8:
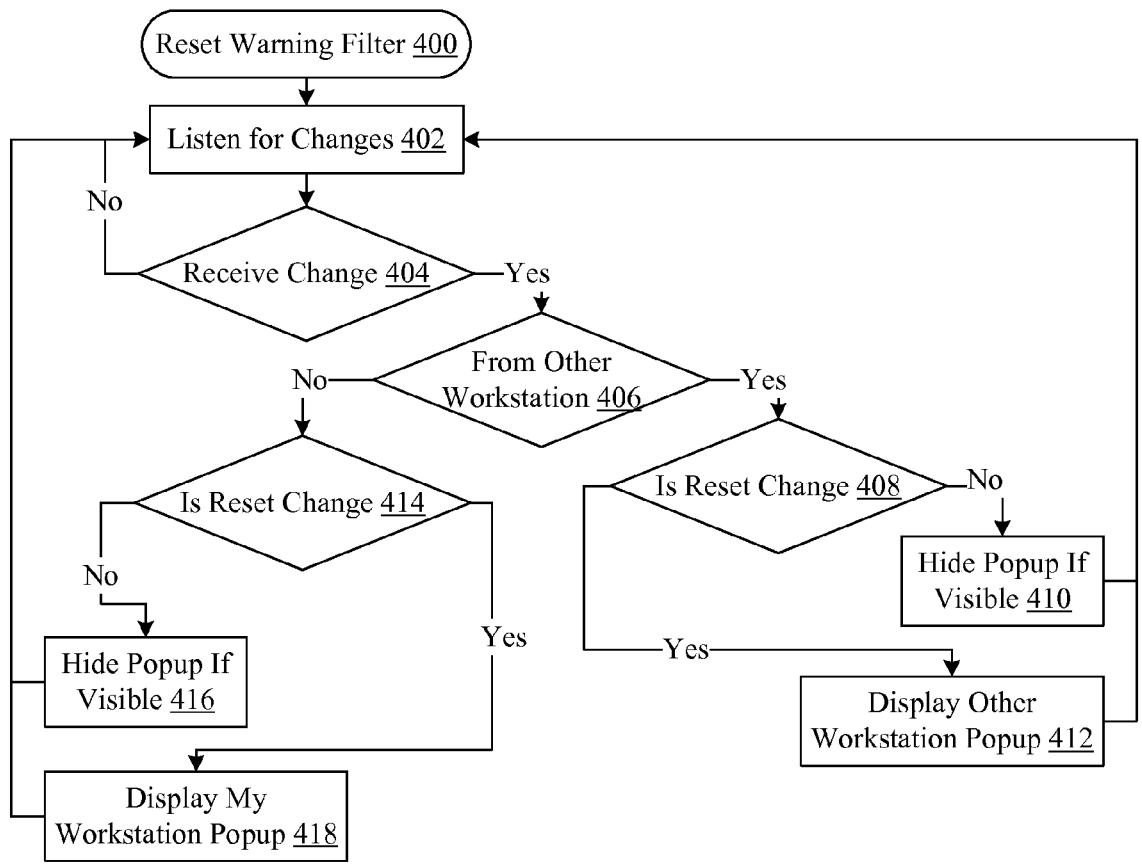
FIG. 8 illustrates a reset warning filter methodology performed by the change monitor of the online programming environment of FIG. 3.

In FIG. 8, with the increase of reset warnings that may be produced by the user's workstation and by other workstations that are in communication, a methodology 400 for filtering reset warnings is added by listening for changes to the base routine in block 402. If a change is received in block 404, then a determination is made as to whether the change is from another workstation in block 406. If so, a determination is made as to whether the change is one that would warrant a reset in block 408. If not, then in block 410 any GUI notification (e.g., popup window) is hidden if it would otherwise be visible to the user. If the notification pertains to a reset, then the popup or other GUI notification is presented in block 412. After block 410 or 412, the method continues to listen in block 402 for another change.

If in block 406 the change was from the user's workstation rather than from another workstation, then a determination is made as to whether the change warrants a reset in block 414.

If not, then the popup is hidden if visible on the user's workstation in block 416. Otherwise, the reset warning is presented, such as by displaying a popup on the user's workstation in block 418. After block 416 or 418, then the method continues to listen for more changes in block 402. The functionality of the My workstation popup in block 418 provides greater interaction, such as the ability to navigate to the depiction of the change.

Figure 9:
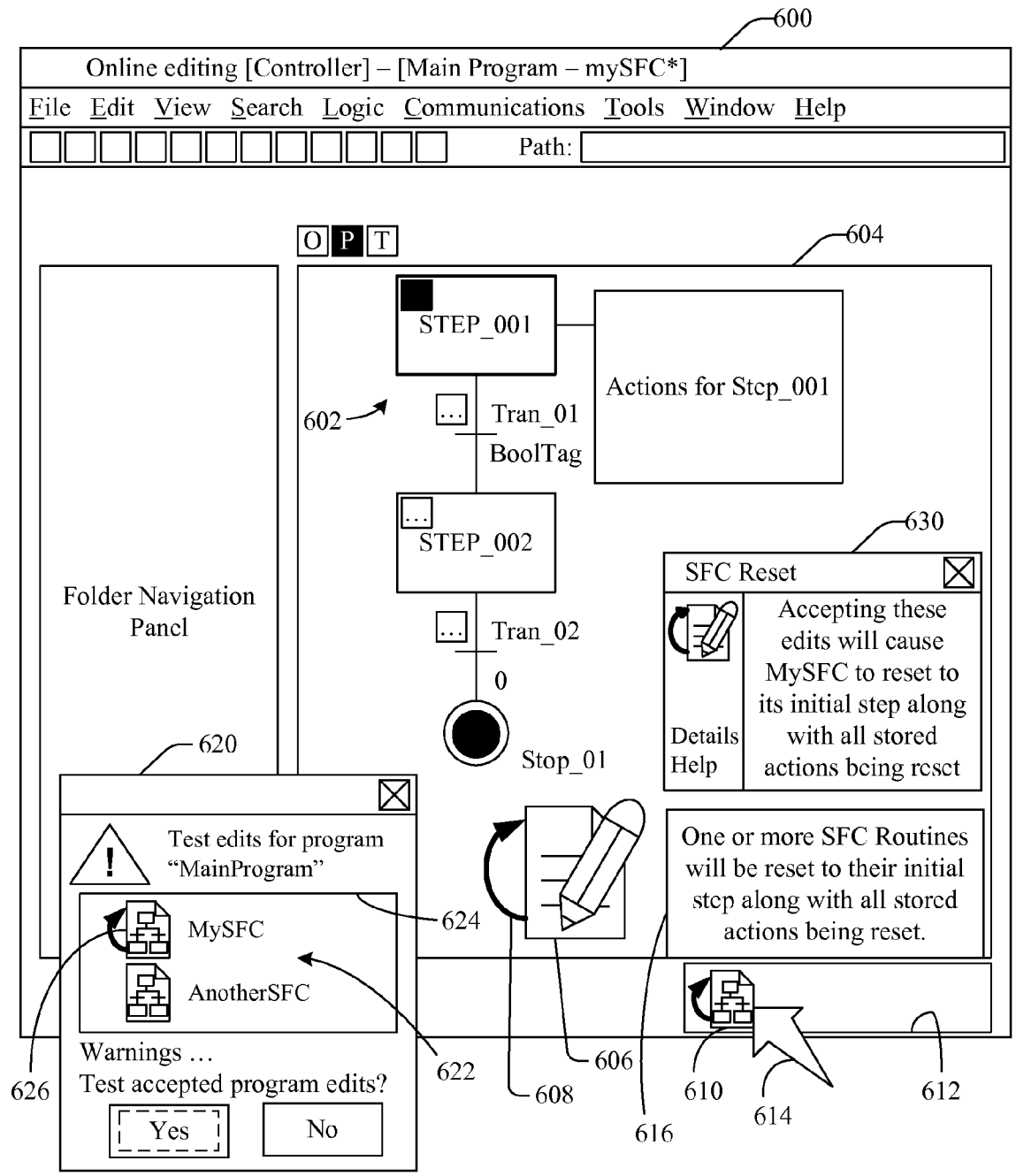
FIG. 9 illustrates a depiction of a graphical user interface of the online programming environment of FIG. 3.

In FIG. 9, an exemplary GUI window 600 allows selecting a container to view an original, a pending edits or a test version of an SFC routine 602 in a view pane 604. An online view watermark 606 visually indicates whether this is original version (e.g., a document symbol), a pending edits as depicted (e.g., document symbol with an overlaid pencil), or a test version (e.g., document symbol with overlaid lightning bolt). The addition of a reset warning symbology, depicted as a curved arrow at 608, indicates that the present SFC chart includes changes that warrant a reset. Specifically, the pending edits will have the modified annotated watermark whenever at least one change exists that will cause a reset. The test edits view will have the annotated watermark whenever there is at least one change that exists in the test edits container that will cause a reset and the controller is in untest mode. The original container will have the annotated watermark when the test edits container has at least one change will cause a reset and the controller is in test mode. The reasoning for this is that the container will cause a reset when switched, but the container that is currently executing cannot cause a reset. Reset icon 610 is displayed when any routine has a reset condition in any container as well, including pending and/or test.

There will be additional annotations to a pending edits container user interface when a reset is required. A reset icon 610 is displayed in a status bar tray 612. Passing a cursor 614 over the reset icon 610 causes a tooltip message 616 that provides additional information, such as the depicted "One or more SFC routines will be reset to their initial step along with all stored actions being reset." the tool tip message 616 is specific to the active SFC routine if that routine requires a reset. If the active SFC routine does not require a reset, the message is the same as if there is a reset in the controller elsewhere and there is no active routine. The status bar reset icon 610 can be selected (e.g., doubled clicked) to open up the routine requiring a reset in a reset element browser. If the active SFC routine requires a reset, then this view will be brought to the top. If no routine Dialog boxes, such as an untest program edits dialog box or the depicted test edits dialog box 620, include a listing 622 of routines in a viewing pane 624 with a reset icon 626 next to those routines that require a reset. Clicking the reset icon 626 opens a reset element browser (not depicted) with the routine being viewed highlighted. Additional warnings can be added to the dialog box for additional explanation such as "The reset icon indicates that the SFC routine will be reset to their initial step along with their stored action being reset."

It should be appreciated that finalizing edits via the GUI window 600 enables a user to select a single button instead of manually having to hit an accept pending edits button, followed by a test edits button, followed by an accept test edits button. When the user finalizes their edits, the change monitor 140 goes through the steps implicit in following these interim steps, however.

In addition, a popup message 630 can be presented on the window 600, such as the depicted one stating that "accepting these edits will cause MySFC to reset to its initial step along with all stored actions being reset."

Figure 10:
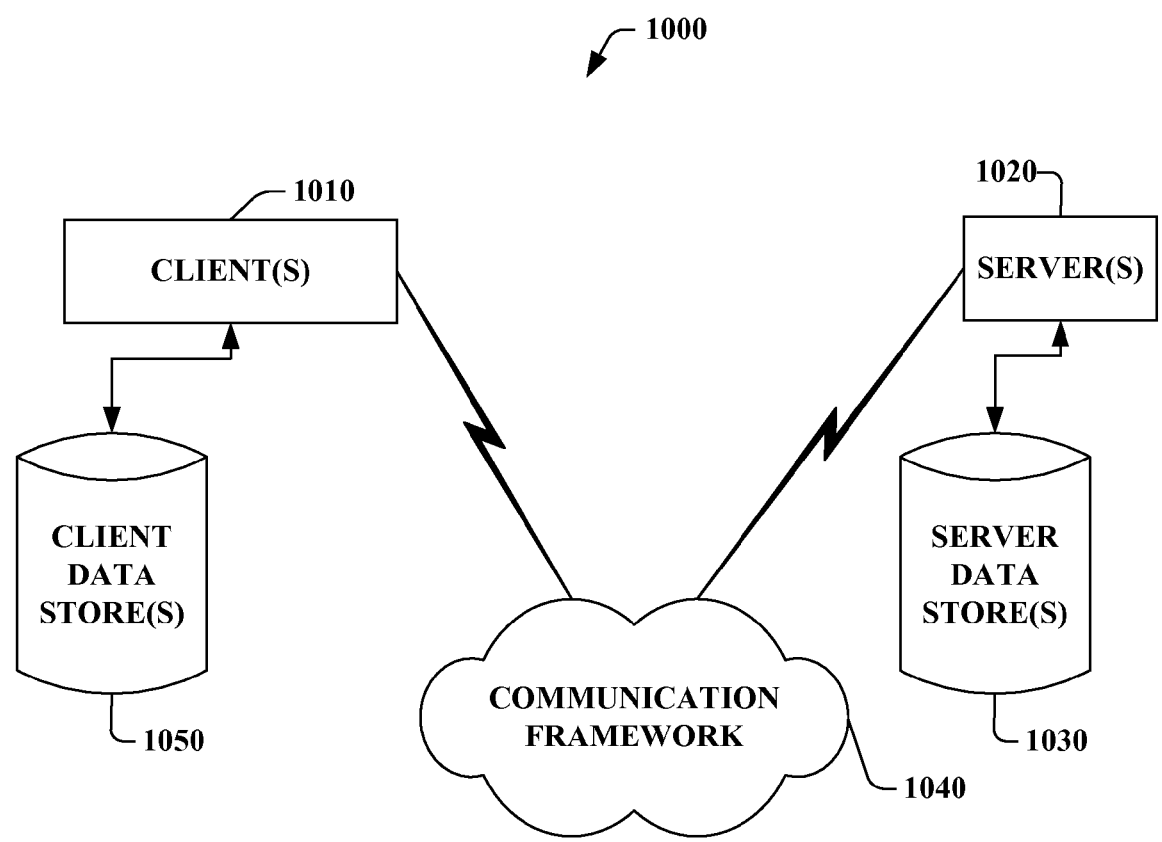
FIG. 10 illustrates an exemplary networking environment, wherein the novel aspects of the claimed subject matter can be employed.

FIG. 10 is a schematic block diagram of a sample-computing environment 1000 with which the claimed subject matter can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject innovation, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1020.

Figure 11:
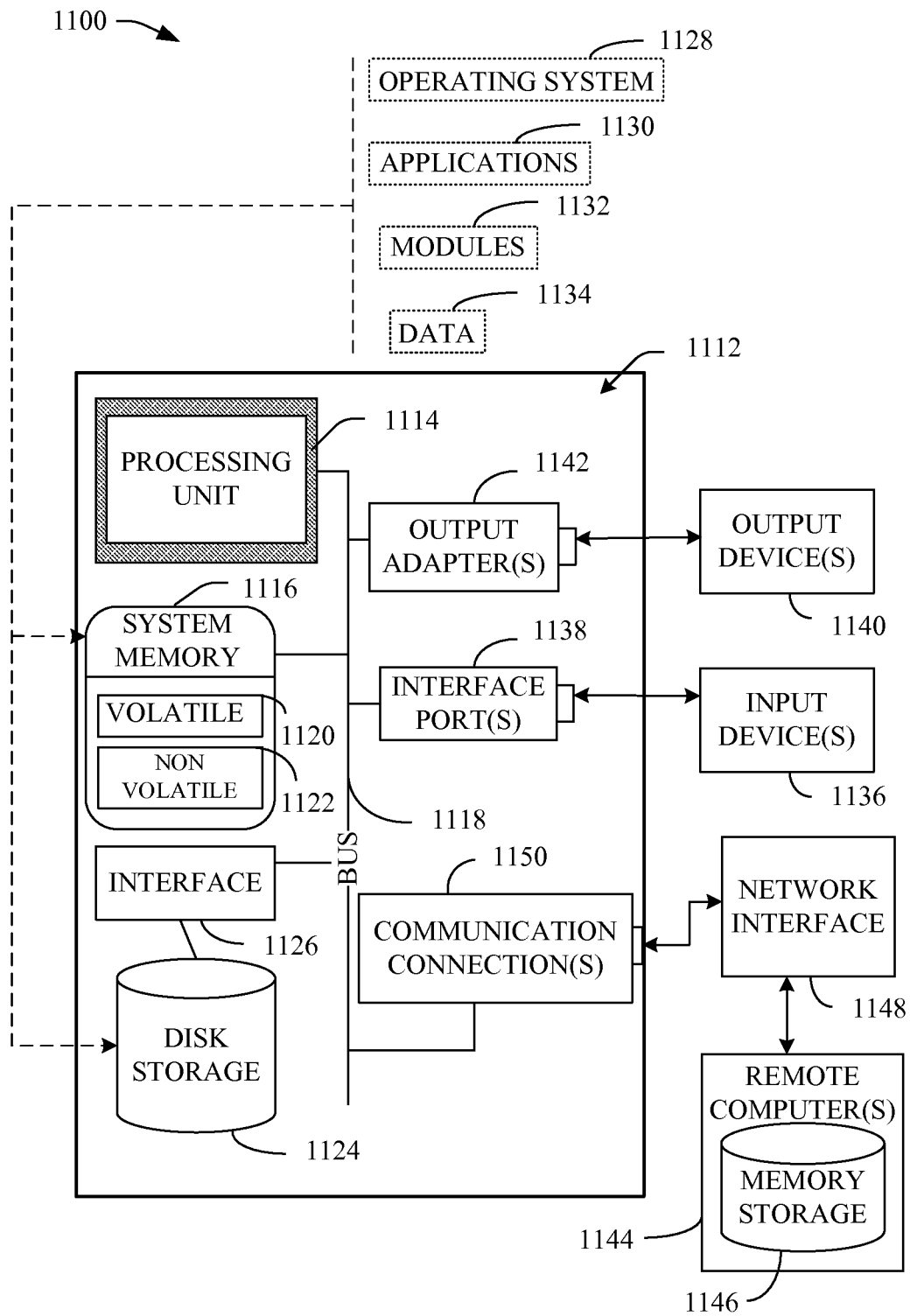
FIG. 11 illustrates an exemplary operating environment that can be employed in accordance with the claimed subject matter.

With reference to FIG. 11, an exemplary environment 1100 for implementing various aspects of the claimed subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/nonvolatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system, the system comprising:
a memory, communicatively coupled to a processor, the memory having stored therein executable instructions, comprising:
a change monitor configured to determine whether a pending edit of an industrial control program executing in a controller requires at least one of the controller or the industrial control program to be reset prior to implementation of the pending edit in the industrial control program, wherein the determination is based at least in part on an assessment of whether a potential outcome, on an industrial process controlled by the industrial control program, of an attribute of the industrial control program will generate a requirement to reset the industrial control program executing in the controller prior to the implementation of the pending edit.

2. The system of claim 1, wherein the change monitor, in response to the reset being implicated, is configured to generate a warning of the reset prior to the implementation of the pending edit in the industrial control program.

3. The system of claim 2, wherein the warning is a display of a reset symbol on a graphical user interface.

4. The system of claim 3, wherein the change monitor is further configured to, in response to selection of the reset symbol, navigate to a depiction of the pending edit on the graphical user interface.

5. The system of claim 3, wherein the warning is a display of at least one of a reset warning icon depicted on a status bar, a reset warning tool tip activated by a cursor, or a reset warning popup window on the graphical user interface.

6. The system of claim 1, wherein the change monitor is further configured to, in response to a determination that the pending edit includes a deletion of an element of the industrial control program, prevent reset of the industrial control program.

7. The system of claim 1, wherein the change monitor is further configured to learn potential outcomes of attributes of the industrial control program that will generate the requirement to reset the industrial control program executing in the controller prior to the implementation of the pending edit.

8. A method, comprising:
identifying, by a system including a processor, a pending of an industrial control program executing in a controller; and
determining, by the system, whether the pending edit requires at least one of the controller or the industrial control program to be reset prior to implementation of the pending edit in the industrial control program, wherein the determination is based at least in part on an assessment of whether a potential outcome, on an industrial process controlled by the industrial control program, of an attribute of the industrial control program will generate a requirement to reset the industrial control program executing in the controller prior to the implementation of the pending edit.

9. The method of claim 8, further comprising, in response to the reset being implicated, generating, by the system, a warning of the reset prior to the implementation of the pending edit in the industrial control program.

10. The method of claim 9, wherein the warning is a display of a reset symbol on a graphical user interface.

11. The method of claim 10, further comprising, in response to selection of the reset symbol, navigating, by the system, to a depiction of the pending edit on the graphical user interface.

12. The method of claim 10, wherein the warning is a display of at least one of a reset warning icon depicted on a status bar, a reset warning tool tip activated by a cursor, or a reset warning popup window on the graphical user interface.

13. The method of claim 8, further comprising, in response to a determination that the pending edit includes a deletion of an element of the industrial control program, preventing, by the system, reset of the industrial control program.

14. The method of claim 8, further comprising learning, by the system, effects of attributes of the industrial control program that will generate the requirement to reset the industrial control program executing in the controller prior to the implementation of the pending edit.

15. A non-transitory computer-readable storage medium comprising computer-executable instructions that, in response to execution, cause a computing system including a processor to perform operations, comprising:
identifying a pending of an industrial control program executing in a controller; and
determining whether the pending edit requires at least one of the controller or the industrial control program to be reset prior to implementation of the pending edit in the industrial control program, wherein the determination is based at least in part on an assessment of whether a potential outcome, on an industrial process controlled by the industrial control program, of an attribute of the industrial control program will generate a requirement to reset the industrial control program executing in the controller prior to the implementation of the pending edit.

16. The non-transitory computer-readable storage medium of claim 15, the operations further comprising, in response to the reset being implicated, generating a warning of the reset prior to the implementation of the pending edit in the industrial control program.

17. The non-transitory computer-readable storage medium of claim 16, wherein the warning is a display of a reset symbol on a graphical user interface.

18. The non-transitory computer-readable storage medium of claim 17, the operations further comprising, in response to selection of the reset symbol, navigating to a depiction of the pending edit on the graphical user interface.

19. The non-transitory computer-readable storage medium of claim 16, wherein the warning is a display of at least one of a reset warning icon depicted on a status bar, a reset warning tool tip activated by a cursor, or a reset warning popup window on the graphical user interface.

20. The non-transitory computer-readable storage medium of claim 15, the operations further comprising, in response to a determination that the pending edit includes a deletion of an element of the industrial control program, preventing reset of the industrial control program.

* * * * *